United States Patent [19]

Alman et al.

[11] Patent Number: 4,945,632

[45] Date of Patent: Aug. 7, 1990

[54] ROTARY LINE FOR ASSEMBLY OF TIP FOR FLEXIBLE HOSE WITH CAULKING MEANS

[76] Inventors: Lev M. Alman, 105, kv. 316, prospekt Rokossovskogo, Minsk; Mikhail A. Lukashevich, 69, kv. 52 ulitsa Volgogradskaya, Minsk, both of U.S.S.R.

[21] Appl. No.: 382,182

[22] Filed: Jul. 19, 1989

[51] Int. Cl.[5] .................................. B23P 21/00
[52] U.S. Cl. ..................... 29/781; 29/237; 29/240; 29/282; 29/788
[58] Field of Search ............ 29/527.1, 564.1, 715, 29/771, 779, 780, 781, 783, 787, 788, 789, 237, 240, 282; 138/44, 137, 155; 285/253, 256; 156/143

[56] References Cited

U.S. PATENT DOCUMENTS

| | | | |
|---|---|---|---|
| 3,096,575 | 7/1963 | Cook | 29/788 X |
| 4,262,408 | 4/1981 | Johnson et al. | 29/788 X |
| 4,339,868 | 7/1982 | Mazzer | 20/564.1 |

FOREIGN PATENT DOCUMENTS 1136925 1/1985 U.S.S.R. .
1186454 10/1985 U.S.S.R. .

Primary Examiner—Mark Rosenbaum
Assistant Examiner—Peter D. B. Vo
Attorney, Agent, or Firm—Fleit, Jacobson, Cohn, Price, Holman & Stern

[57] ABSTRACT

A rotary line for assembly of a tip for a flexible hose includes an automatic rotary for feeding the line with tip bodies and insert, transportation rotors, a pressing rotor with monitoring devices, an automatic rotary caulking means, devices for monitoring the depth of the caulking trail, and a control system.

9 Claims, 16 Drawing Sheets

ROTARY LINE FOR ASSEMBLY OF TIP FOR FLEXIBLE HOSE WITH CAULKING MEANS

FIELD OF THE INVENTION

The invention relates to machine assembly and specifically, to methods for assembly of tips for flexible hoses and rotary lines for implementing the same.

The invention may be used to the best advantage for assembly of tips for flexible hoses of a hydraulic brake system in transportation facilities.

BACKGROUND OF THE INVENTION

Absence of monitoring the pressing and caulking parameters in assembling tips for flexible hoses fitted in a hydraulic system of transportation facilities makes it difficult to guarantee the mechanical strength of fastening an insert in a tip body and a tight contact of the insert surfaces with the tip body. Absence of mechanical strength and tight connection between the insert and the tip body in a hydraulic system of transportation facilities results in emergency situations.

Known in the art is an apparatus for pressing a thin-walled part into a base part, essentially an insert into the body of a tip in a hydraulic hose (cf., SU, A, 1,136,925), comprising a base-mounted multiposition revolving table with peripherally disposed mandrels for parts being assembled, a mechanism to feed base parts to the assembly zone, made in the form of a hopper, a mechanism to feed thin-walled metal parts, a mechanism for centering and installing a thin-walled part on the table mandrel, a mechanism for fitting a base part on the table mandrel, a unit for calibration of a thin-walled part, and also a pressing and caulking mechanism.

The mechanism for centering and installing a thin-walled part on the table mandrel is made in the form of a lever with one end thereof hingely fitted on a base and the other end spring-loaded relative to the latter, a support for a thin-walled part, hingely mounted on the lever spring-loaded end with a possibility to rotate around its axis in a plane perpendicular to the mandrel longitudinal axis, and also a pusher assoociated through the lever with a power cylinder and provided with a former. The pusher rests on the base and is free to interact with the former and a lever-mounted roller.

The mechanism for fitting a base part on the table mandrel is made in the form of a power cylinder, whose rod mounts a knife edge to receive the base part.

The pressing and caulking mechanism is made as a power cylinder with a hollow rod, and the unit for calibration of a thin-walled part represents a calibration rod driven by the power cylinder. The calibration rod is accommodated in the power cylinder rod.

The multiposition revolving table is provided with a relevant slewing and locking mechanism in the form of a drive motor with an engagement coupling and a locking rod, interconnected by a synchronizing shaft with a rotation drive thereof and levers fixed on its ends.

The thin-walled metal part in said prior art apparatus is fed in an oriented position from a feeding mechanism to the support of the mechanism for centering and installing a thin-walled part. During the forward stroke of the centering mechanism pusher, the spring acts upon the support and presses it to the mandrel, encloses it and is thus centered relative to the latter. Then the pusher moves the thin-walled part relative to the support and fixes it in the hole of the table mandrel.

When the pusher has assumed the initial position, the table makes a revolution.

From the hopper, the base comes to the knife edge of the mechanism for fitting the base part on the table mandrel and, as the power cylinder rod moves on, is accommodated on the mandrel, whose hole has already received the thin-walled part. Then the table revolves, and the mandrel with the parts being assembled approaches the pressing and caulking mechanism. When the table comes to a standstill, the power cylinder operates, as a result of this the calibration rod passes through the hole in the thin-walled metal part, whereupon the pressing and caulking mechanism power cylinder is actuated, and its hollow rod presses and caulks the thin-walled part into the base part. The pressing and caulking over, the calibration rod leaves the holes of parts, and the hollow rod returns to the initial position.

However, the foregoing prior art apparatus fails to assure an adequate quality of the flexible hose tip assembly, for the pressing and caulking are done by one mechanism and, as the caulking effort is greater than the pressing effort shifting and misalignment of the insert in the tip body are not improbable. In this apparatus, the assembly is performed by units which could well monitor the pressing and caulking efforts. Moreover, absence of monitoring cannot guarantee an adequate mechanical strength and tightness of the connection.

Also known is an automatic facility for assembly of tips for flexible hoses (cf., SU, A, 1,186,454), containing a base mounting an automatic rotary means for feeding the line with tip bodies and an automatic rotary means for feeding the same with inserts, each provided with a pre-hopper for collecting and feeding the parts to said automatic means, a pressing rotor with arrangements for monitoring the minimum and maximum pressing efforts, a caulking rotor, and transportation rotors. The facility for assembly of tips for flexible hoses also includes a control system with a memory.

The automatic rotary means for feeding the line with parts of a tip body type comprises a shaft rotatable mounted on a base. The shaft carries a hopper with gripping members made in the form of revolving funnels equally spaced about its periphery. Rigidly attached to the hopper bottom is a taper disk with the pre-hopper mounted thereunder with a clearance. The automatic rotary means also contains collectors with piece-wise feed mechanism and a feed cutoff mechanism.

The pre-hopper is made in the form of an annular shell with a conical bottom coupled with the shell by connectors. The annular shell is linked with the base of the automatic rotary means by a flexible coupling, e.g. by a spring and a vibrator. Attached to the pre-hopper conical bottom on the shell inner surface is a sectionalized tray forming collecting containers with windows on the bottom of the setionalized tray to release batches of tip bodies. The annular shell end surface fits the conical bottom to form with the latter an additional annular container. The annular shell has windows for the parts to pass from the additional annular container to the hopper of the automatic rotary feeding means.

Each piece-wise feed mechanism is made in the form of shutoff devices actuated by formers. One of formers represents a double-arm lever. The feed cutoff mechanism comprises an electromagnet coupled by the memory with the line control system. The collectors are fitted under each gripping member. Mechanisms for secondary orientation of the tip body are installed under the collectors. Each mechanism for secondary orientation is actually a revolving drum with a through channel and clamping jaws. Arranged above each hole is a mechanism for identification of the tip body made in the form of a rod interacting with a stationary former. The jaws form a radial window for the parts to pass to the through hole of the revolving drum. Each orrientation mechanism contains a lock to restrict radial displacement of the drum and a gear interacting with a toothed rack made to reciprocate by the stationary annular former.

The automatic rotary means for feeding the line with parts of an insert type includes a mechanism for imparting reciprocal motion to sector grips. Each sector grip is hingedly associated with an intermediate shaft accommodated in sliding bearings inside a hollow support column. A drum with the rotary means rotation drive is fixed on the outside of the column with the aid of rolling bearings. The drum is connected to a hopper with radial slots in the bottom. A second drum is freely fitted on a central bushing rigidly mounted on a central shaft connected with the intermediate shaft. Feeder bodies are radially attached on the second drum. The periphery of the upper end of each feeder body has a hinge to connect the bodies with the sector grips. Each sector grip is associated with the feeder body by a spring and has a roller entering a cylindrical groove in the bushing. The hopper bottom has a radially disposed projections to help the insert type to sink into the sector grips. A collector tube is mounted on the hopper opposite to each sector grip.

Rigidly coupled to the hopper of the automatic rotary means for feeding the line with inserts is a taper disk, clearance-fitted over which is a pre-hopper in the form of an annular shell with a conical bottom coupled to it through connectors. The annular shell is associated with the base of the automatic rotary means through a flexible coupling, e.g. by a spring and a vibrator. Attached to the pre-hopper conical bottom on the inner surface of the shell is a sectionalized tray, forming collecting containers, with windows provided on the bottom of the sectionalized tray to release batches of insert type parts. The pre-hopper conical bottom is fitted on an axle eccentrically with the pre-hopper conical bottom. The end surface of the annular shell is free to contact the taper disk to form with the latter and the pre-hopper conical bottom an addtional annular container. The annular shell has windows for the parts to pass from the additional annular container to the hopper of the automatic rotary means.

The pressing rotor comprises drive shaft-mounted drum with equidistant peripherally arranged working heads with upper and lower sliders, which are free to reciprocate and are provided with a support tool and a punch, a catcher with a spring being installed inside the tool coaxially therewith. The slider encloses a calibrated spring resting on the support guided by the blushing, and the end surface carries a centering catcher groove for the tip.

The sliders are associated with former-actuated rods installed in the drums fixed on a drive shaft. The latter is mounted on bearings fitted on the base of the automatic rotary means and is connected with the drive shaft with the aid of a gear. The base mounts a contactless limit switch.

The ends of the rod carries a roller resting on the former hingedly mounted on the base through a support and an axle and resting on the lever associated with the rod with a calibrated bank of springs resting on a collar thereof. A contactless transducer is installed close to the lever.

The caulking rotor contains a drive shaft-mounted drum with equidistant peripherally arranged working heads with sliders, which are free to reciprocate and are provided with a support tool and a punch enclosing a calibration needle.

One slider is coupled with a hydraulic cylinder rod and the other with a rod enclosed in a drum fixed on a drive shaft. The latter is supported in bearings on the base and connected with the drive of the automatic rotary means by a gear.

The rotary automatic means for feeding the line with tip bodies and inserts, and the pressing and caulking rotors are interconnected by transportation rotors intended for transferring the parts from rotor to rotor and made in the form of base-mounted driven shafts with rigidly connected disks. The latter are provided with radially disposed holes accommodating spring-loaded sliders carrying grips in the form of tongs.

The control system is essentially a controller and peripheral monitoring and actuating devices, e.g. transducers to monitor the presence of parts, photosensor, electromagnets and electric motors.

In said prior art apparatus, the parts being assembled—the tip body and the insert—come to the loading area of each part from the automatic rotary means.

The transportation rotor transfers inserts piecewise to a tool block of the caulking rotor, wherein they are arranged coaxially with the catcher and the puch hole and pushed into the latter by the catcher. Thus the insert finds itself in the working head which, moving jointly with the drum, subsequently comes to the tip body loading zone, the tip also installed coaxially with the caulking rotor catcher groove and put on the punch in which the insert has been accommodated. Both parts being assembled—the tip body and the insert—are thus loaded into the working head of the pressing rotor and accommodated coaxially with each other.

Specifications for the assembly of said parts restrict the minimum and maximum pressing efforts, i.e. the pressing effort must not go beyond the limits of the prescribed pressure interval. Accordingly, the pressing rotor has two pressing zones—a minimum effort monitoring zone and a maximum effort monitoring zone.

The minimum pressing effort is monitored as follows. The former lifts the rod, and the latter shifts the slider with the punch which encloses the parts being assembled till they thrust against the support. The latter is loaded by a spring calibrated for the present minimum pressing effort. If pressing the insert into the tip boody takes an effort smaller than that built up by the spring, the insert will be pressed into the tip body and the clearance between the support collar and the collar of the guide bushing will remain. The lever sill enter the clearance and will not turn about its exis or close the contactless limit switch. Such a part will be subsequently rejected.

If pressing the insert into the tip body requires an effort greater than that of the calibrated spring, the support, as the slider with the punch and parts being assembled go up to till pressed to it, will likewise go up and compress the spring, as a result of which the clearance between the support and bushing collars will disappear. The lever will not enter the clearance; it will turn about its axis and close the contactless limit switch.

Such a part is taken to have passed the test for the minimum pressing effort.

The working head with this part moves to the maximum pressing effort monitoring zone. The rod with the roller running on the end former lifts the slider with the punch till it thrusts against the support. If the pressing effort exceeds the maximum permissible value to which the bank of disk springs has been adjusted, the former will go down after turning about its axis and press the lever which will shift the rod and compress the bank of disk springs. While turning, the lever will close the contactless limit switch. Such a part will be subsequently rejected, as the pressing effort was in excess of the maximum permissible value.

If the pressing effort is weaker than the one to which the bank of disk springs has been adjusted and greater than the minimum permissible, the lever will not turn to cut off the transducer; such a part is regarded as fit for use.

The transportation rotor extracts the serviceable parts from the working heads of the pressing rotor and transfers them to the working heads of the caulking rotor, wherein they are placed on the punch coaxially with the support. The hydraulic cylinder rod acts upon the slider to impart the caulking effort to the tip, which receives the punch annular collar to caulk the insert into the tip body. The calibration needle guaranntees that the inner hole in the insert after caulking will not diminish. The transportation rotor takes the part out of the working head and transfers it to a container for finished parts.

However, the foregoing prior art automatic rotary facility for assembly of tips for flexible hoses has the following shortcomings; it contains no means to monitor the depth of the caulking trial, i.e. the tightness of the joint between the insert and the tip body is not monitored, the mechanism for secondary orientation of the rotary automatic means for feeding the line with tip bodies being made in the form of rotary tong-like grip with a through hole and clamping jaws does not assure reliable orientation of insert type parts with holes on both sides and a connector offset relative to the middle located therebetween; jamming of parts is probable in the automatic rotary means for feeding insert type parts when the latter are transferred from the slot of the inclined sector grip to the vertical collector; the surface of the pre-hopper taper shall being made solid does not provide free access to the parts being collected for the gripping members, as a result of which the parts may accumulate at the slot through which they pass from the pre-hopper to the hopper.

SUMMARY OF THE INVENTION

It is therefore an object of the present invention to improve the quality of assembly of a tip for a flexible hose by providing a tight joint between the insert and the tip.

This object is accomplished by that a rotor line for assembly of a tip for a flexible hose, comprising base-mounted automatic rotary means for feeding the line with tip bodies and inserts, transportation rotors, a pressing rotor with devices for monitoring the minimum and maximum pressing efforts, a caulking rotor having a tool holder with tool blocks installed on a drive shaft, each block made in the forms of coaxial rods, one connected with a support tool and the other with a cauling punch, and also a control system with a memory, according to the invention, is provided with devices for monitoring the depth of the caulking trail, installed in the tool blocks of the caulking rotor, and also connected, through photosensor, with the memory of the line control system, associated with rotary automatic means for feeding the line with tip bodies and inserts provided with pre-hoppers for storing non-orientated workpieces, each device or monitoring the depth of the caulking trail being made in the form of a bushing with measuring rods, installed on the caulking punch with a possibility of axial displacement, a holder with recess on its side surface to partially receive balls and arranged on a rod carrying the caulking punch with a possibility of axial and angular displacement and interaction of its end surface with the end surface of said holder and spring-loaded relative to the rod along its axis towards friction blocks installed between the base bushing and the rod, the base bushing and the holder being provided with flags having slots to pass the beams of the photosensor, a spring-loaded rod lock is fitted on the flag of the base bushing and the flag of the holder has holes for accommodating said lock, the base is provided with a former free to interact with the roller of the spring-loaded lock, and the rod carrying the caulking punch has spiral slots to accommodate the balls of the holder.

The provision of the rotary line for assembly of a tip for a flexible hose with devices to monitor the depth of the caulking trail makes it possible to obtain the preset depth of the caulking groove and, consequently, reliable tightness of the joint between the tip body and the insert.

The connection of the device to monitor the depth of the caulking groove with the memory of the line control system through the photosensor permits of monitoring the boundary values of the permissible depth of the caulking groove, which guarantees tightness of the joint.

The connection of the device to monitor the depth of the caulking groove with the automatic rotary means for feeding the line with tip bodies and inserts ensures operation of the monitoring device of only those caulking tool blocks, for which parts from the automatic rotary feed means have been supplied.

It is advisable to provide the automatic rotary means for feeding the line with tip bodies with a clamping mechanism made in the form of a spring-loaded plate with a hole free to displace in a horizontal plane, the diameter of the hole being larger than that of the channel in the drum, and two stops arranged under the plate, each free to rotate in a horizontal plane towards each other and rigidly associated with one end of the levers installed in the body under the plate with a possibility of rocking and the other end of each lever being free to move along a slot made in the plate.

The clamping mechanism being made in the form of a plate with a hole and a slot for the levers makes it possible to identify parts with an inner hole and asymmetric connector without misaligning the axis of said parts, when clamping them, relative to the axis of the drum channel.

It is desirable that the mechanism for identifying the position of the tip body be made in the form fo a rod, free to reciprocate along the diametral channel of the revolving drum.

Such embodiment of the identification mechanism allows orientation to be effected on the basis of the inner surface of the hole in the tip body.

It is also practicable that the automatic rotary means for feeding the line with inserts be provided with shut-off devices, each made in the form of a slider with a through window, free to reciprocate in the direction parallel to the shaft axis between a suitable collector tube and a sector grip and kinematically associated with the latter, with a window being made in each collector tube on the side facing the shutoff device.

Such embodiment of shutoff devices with which the automatic rotary feed means is provided eliminates jamming of parts at their entry into the collector tube, thereby ensuring uniform feeding of parts from the automatic rotary means for feeding the line with inserts.

It is desirable that the generatrices of both the through window in the slider and the window in the collector tube are inclined towards the axis of the hole in the collector tube.

Such inclination will promote unimpeded passage of inserts from the window in the slider to the window in the collector tube.

It is also desirable that the inclination angle of the generatrices of the through window in the slider and the window in the collector tube is 30°–45° with respect to the plane perpendicular to the axis of the collector tube.

This value of the inclination angle of the window generatrices permits displacement of the inserts by gravity.

It is expedient that the pre-hopper taper shell be made of individual spring-loaded sectors, each made in the form of a double-arm lever, with one arm thereof contacting a stationary cam fitted on the base of the automatic rotary means.

Such embodiment of the annular shell eliminates jamming of parts in the space between the hopper and the taper shell, which allows the parts to be continuously fed to the gripping mechanism of the automatic rotary feed means.

It is desirable to provide each automatic rotary feed means with a transducer to monitor the level of parts, mounted on the base and free to interact with one of the arms of the additionally fitted double-arm lever spring-loaded relative to the hopper cylindrical shell end whose other arm is free to interact with one of the sectors of the taper shell.

This assures uninterrupted work of the line automatic rotary means.

BRIEF DESCRIPTION OF THE DRAWING

The invention will now be explained by a detailed description and a specific embodiment thereof in a rotary line taken in conjunction with the accompanying drawings, in which.

DESCRIPTION OF THE PREFERRED EMBODIMENT

Figure 1:
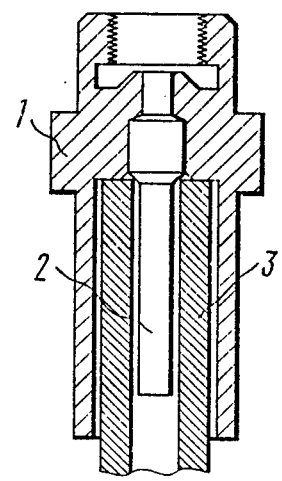
FIG. 1 illustrates a diagram for pressing an insert into a tip body.
Figure 2:
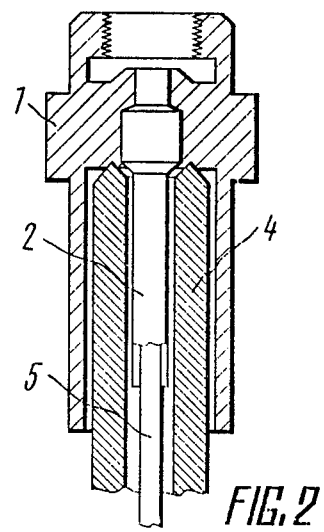
FIG. 2 illustrates a diagram for caulking an insert into a tip body.

The present invention uses a body of a tip 1 and an insert 2. To assemble them, the insert 2 is fitted in the hole of a punch 3 (FIG. 1) and the body of the tip 1 is centered with respect to the external diameter of a punch 4 (FIG. 2) enclosing a calibration needle 5.

Figure 3:
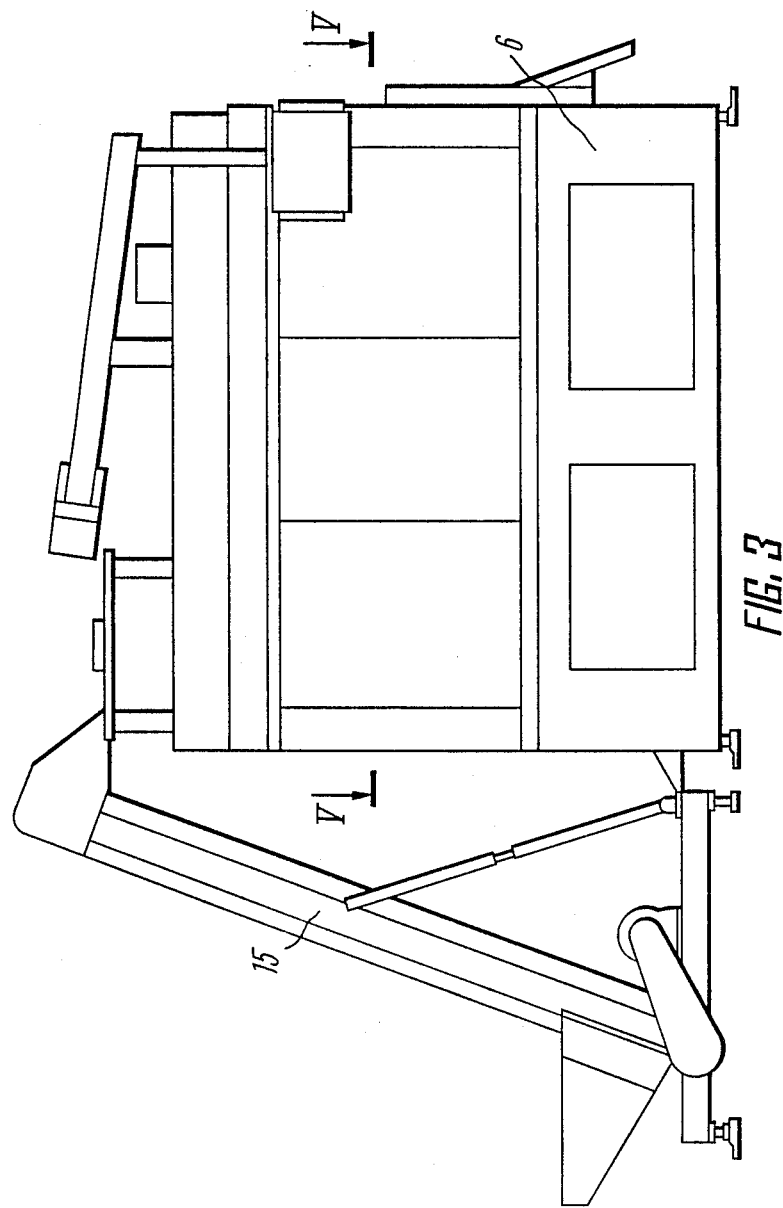
FIG. 3 is a schematic representation of a rotary line for assembly of a tip for a flexible hose (front view)
Figure 4:
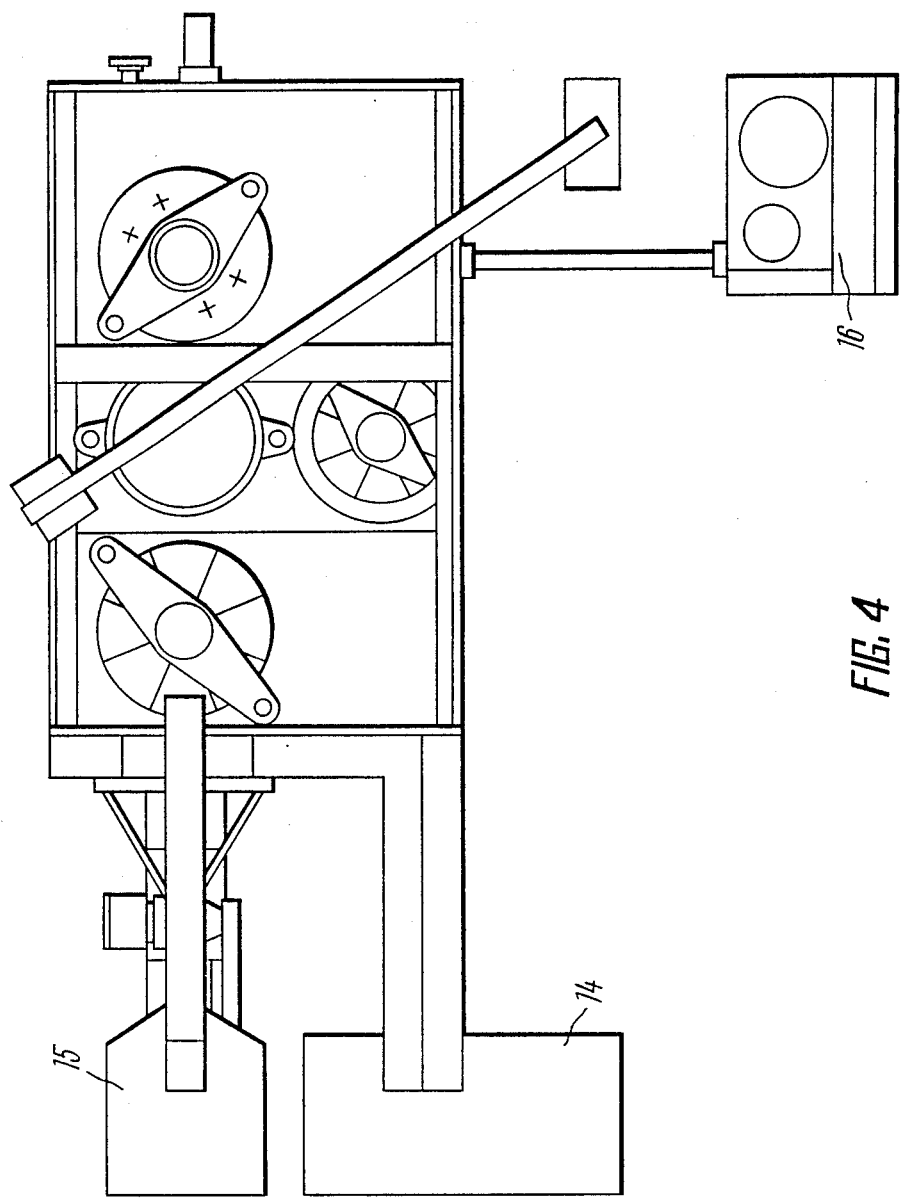
FIG. 4 shows a rotary line for assembly of a tip for a flexible hose (plan view)
Figure 19:
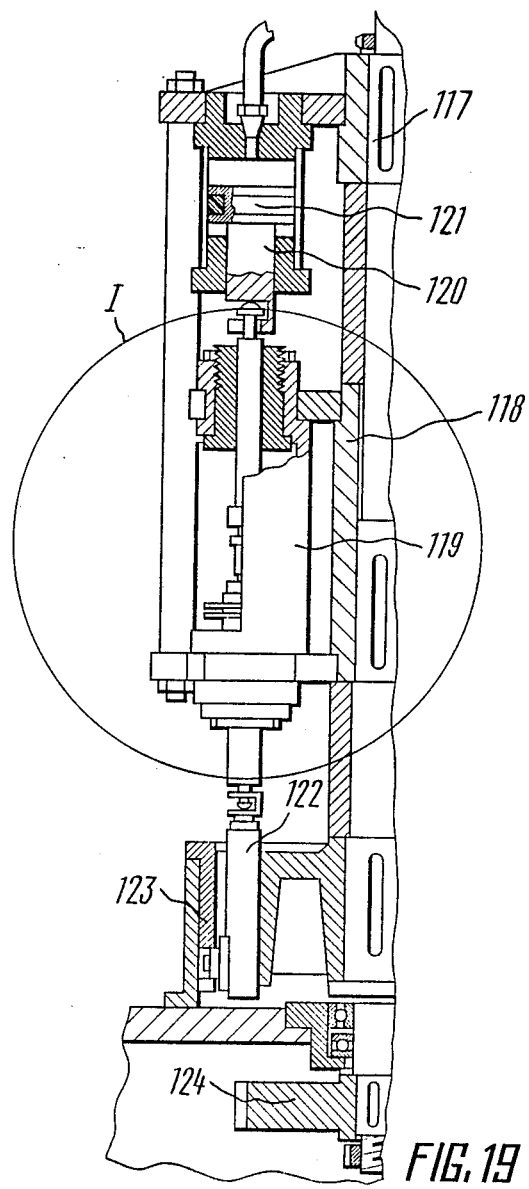
FIG. 19 illustrates a caulking rotor, longitudinal section.

A rotary line for assembly of tips for flexible hoses in brake system comprises a base (FIG. 3) carrying an automatic rotary means 7 (FIG. 5) for feeding the line with the tips 1, an automatic rotary means 8 for feeding the line with the inserts 2, a pressing rotor 9, a caulking rotor 10, transportation rotors 11, monitoring device 150, a memory 12, and scrap removal mechanism 13. The line also contains a cabinet 14 (FIG. 4) of a control system, an elevator hoist 5 to replenish the auomatic rotary means 7 with the tip bodies, and a hydrostation 16 to feed a working medium to hydraulic cylinders 121 (FIG. 19) of the caulking rotor 10.

Figure 6:
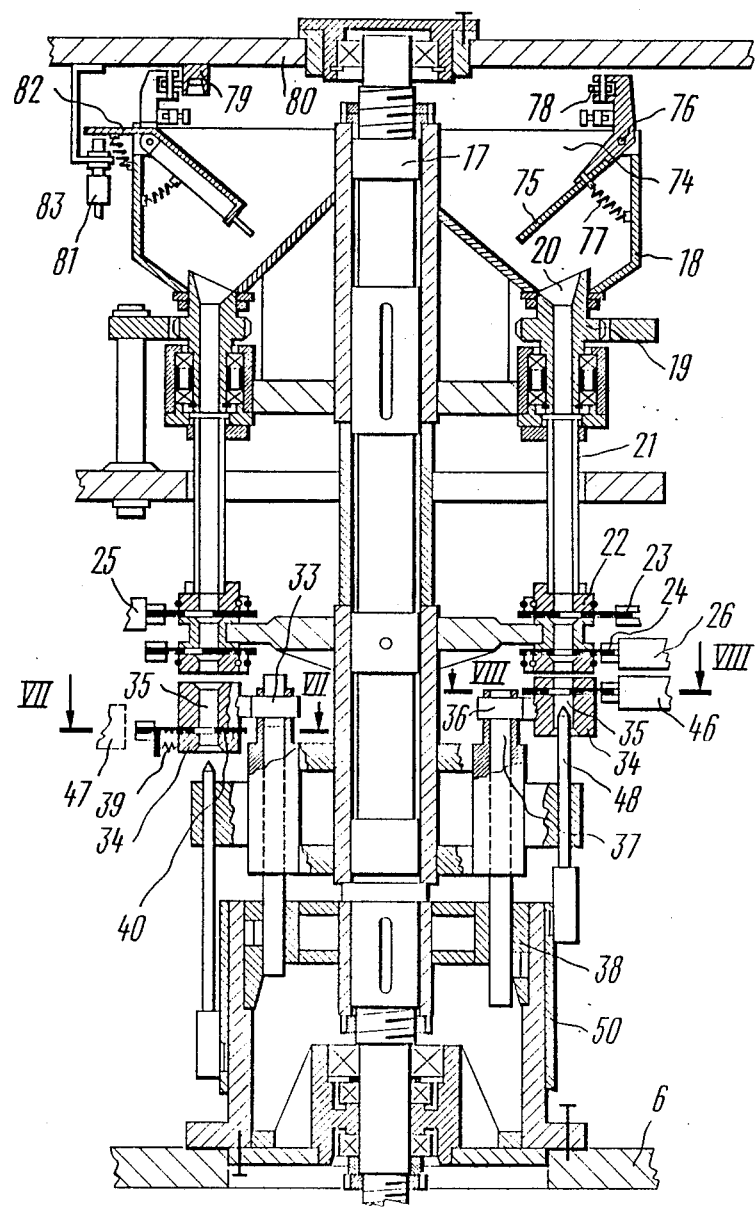
FIG. 6 is an automatic rotary means for feeding the line with tip bodies.
Figure 13:
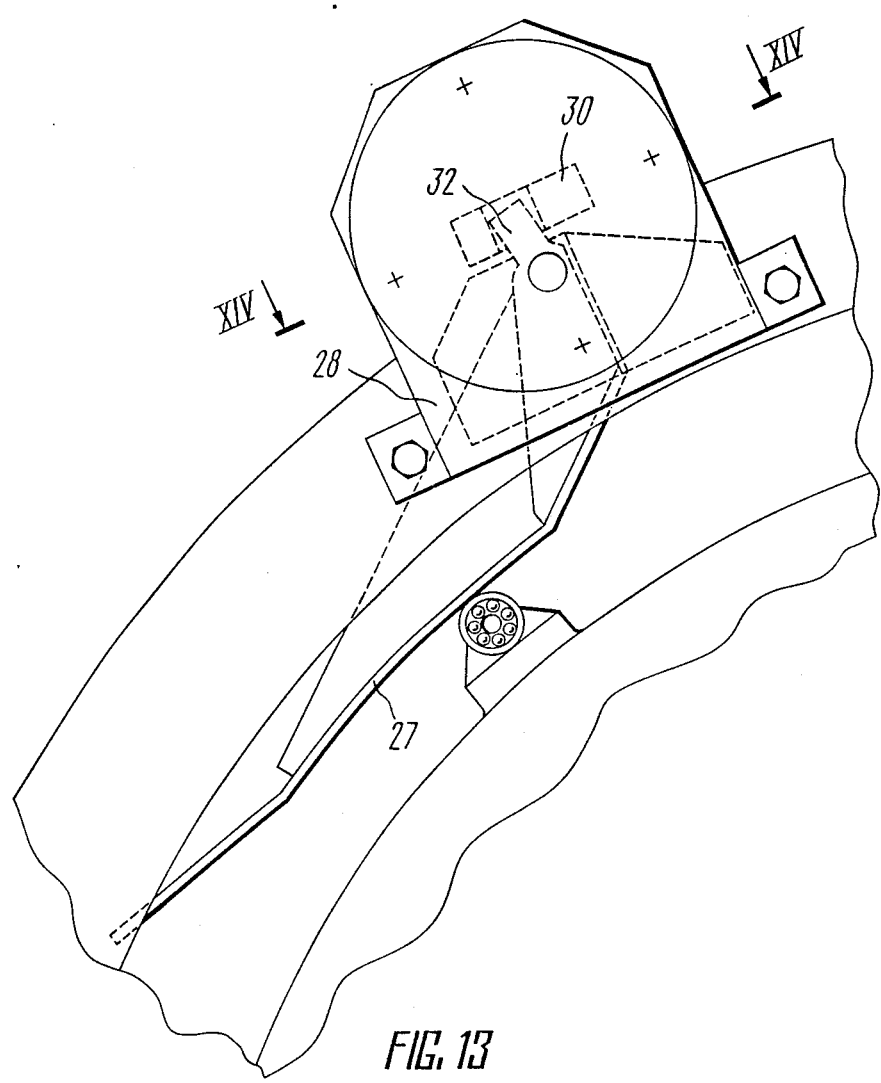
FIG. 13 is a section taken along line XIII—XIII in FIG. 10.
Figure 14:
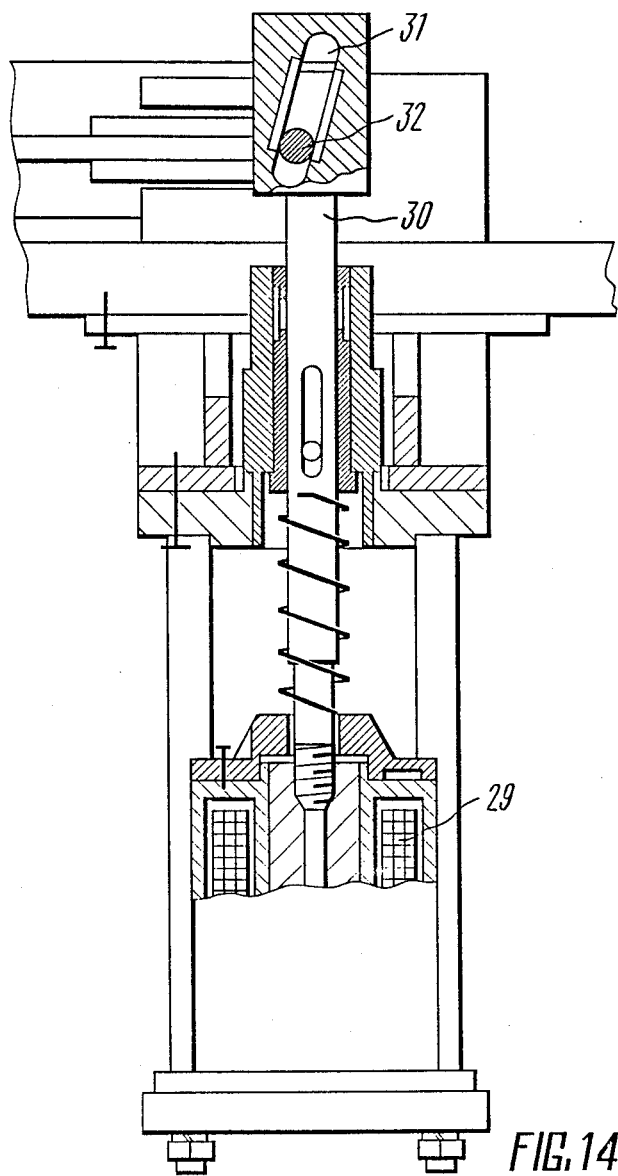
FIG. 14 is a section taken along line XIV—XIV in FIG. 13.

The automatic rotary means 7 for feeding the bodies of the tip 1 includes a shaft 17 (FIG. 6) mounted rotatably on the base 6. The shaft 17 carries a hopper 18 with a conical bottom and gripping members 19 made in the form of revolving funnels 20 evenly distributed on the periphery of the hopper 18. Located under each gripping member 19 are collectors 21 with piece-wise feed mechanisms 22 provided with shutoff devices 23 and 24. The shutoff devices 23 and 24 are operable from formers 25 and 26, respectively. The former 26 is made in the form of a double-arm lever 27 (FIG. 13) with a feed cutoff mechanism 28 including an electromagnet 29 (FIG. 14) connected with the aid of a slider 30 and having an inclined slot 31 with a journal 32 of the lever 27. The electromagnet 29 is associated with the line control system via the memory 12.

Figure 7:
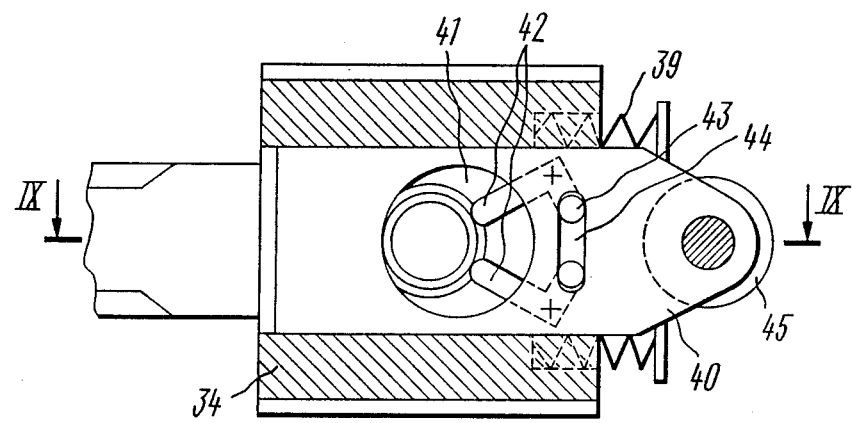
FIG. 7 is a section taken along line VII—VII in FIG. 6.
Figure 8:
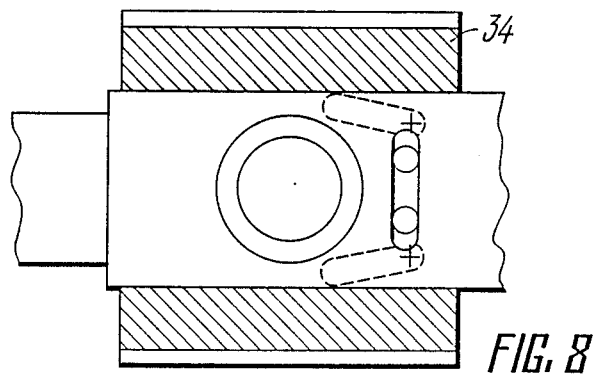
FIG. 8 is a section taken along line VIII—VIII in FIG. 6.
Figure 9:
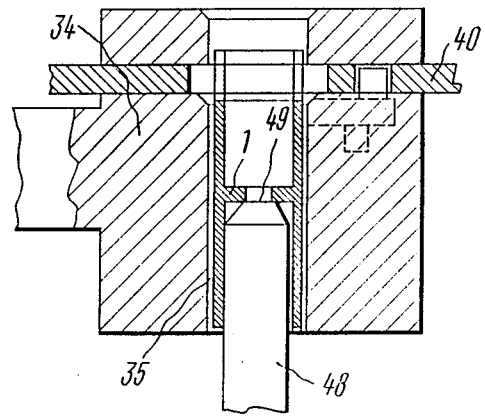
FIG. 9 illustrates a diagram for identifying the position of the tip body.

The automatic feed means 7 comprises secondary orientation mechanisms 33 disposed under the collectors 21. The mechanism 33 is made in the form of a revolving drum 34 with a diametral channel 35. The channel 35 encloses a toothed shank 36 meshed with a rack 37 actuated by a former 38. The revolving drum 34 houses a clamping mechanism made in the form of a plate 40 with a hole 41. The plate 40, loaded by springs 39, is free to displace in a horizontal plane (FIG. 7). The diameter of the hole 41 is larger than that of the channel 35 of the drum 34 to permit displacement of the plate 40 as the oriented body of the tip 1 is clamped. The drum 34 also encloses two stops 42 arranged under the plate 40, each of them being free to rotate in a horizontal plane towards each other and rigidly associated with one end of a lever 43.

The lever 43 with the stop 42 is installed in the drum 34 with a possibility of rocking therein. The other end of each lever 43 is free to move inside a slot 44 in the plate 40.

The plate 40 carries a roller 45 which alternately contacts formers 46 and 47. The automtic rotary means 7 also has a mechanism for identifying the position of the tip body, free to reciprocate along the diametral channel 35 of the drum 34 actuated by a former 550.

Figure 12:
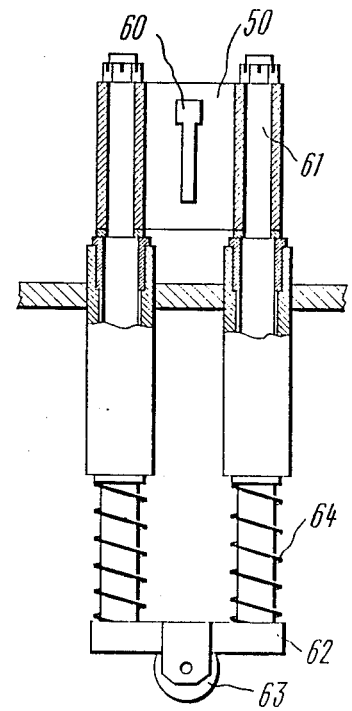
FIG. 12 is a section taken along line XII—XII in FIG. 11.
Figure 11:
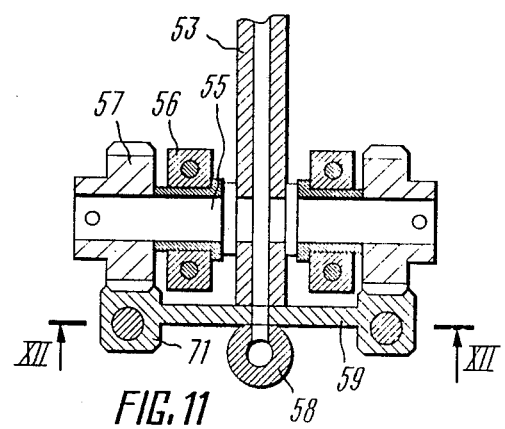
FIG. 11 is a section taken along line XI—XI in FIG. 10.
Figure 10:
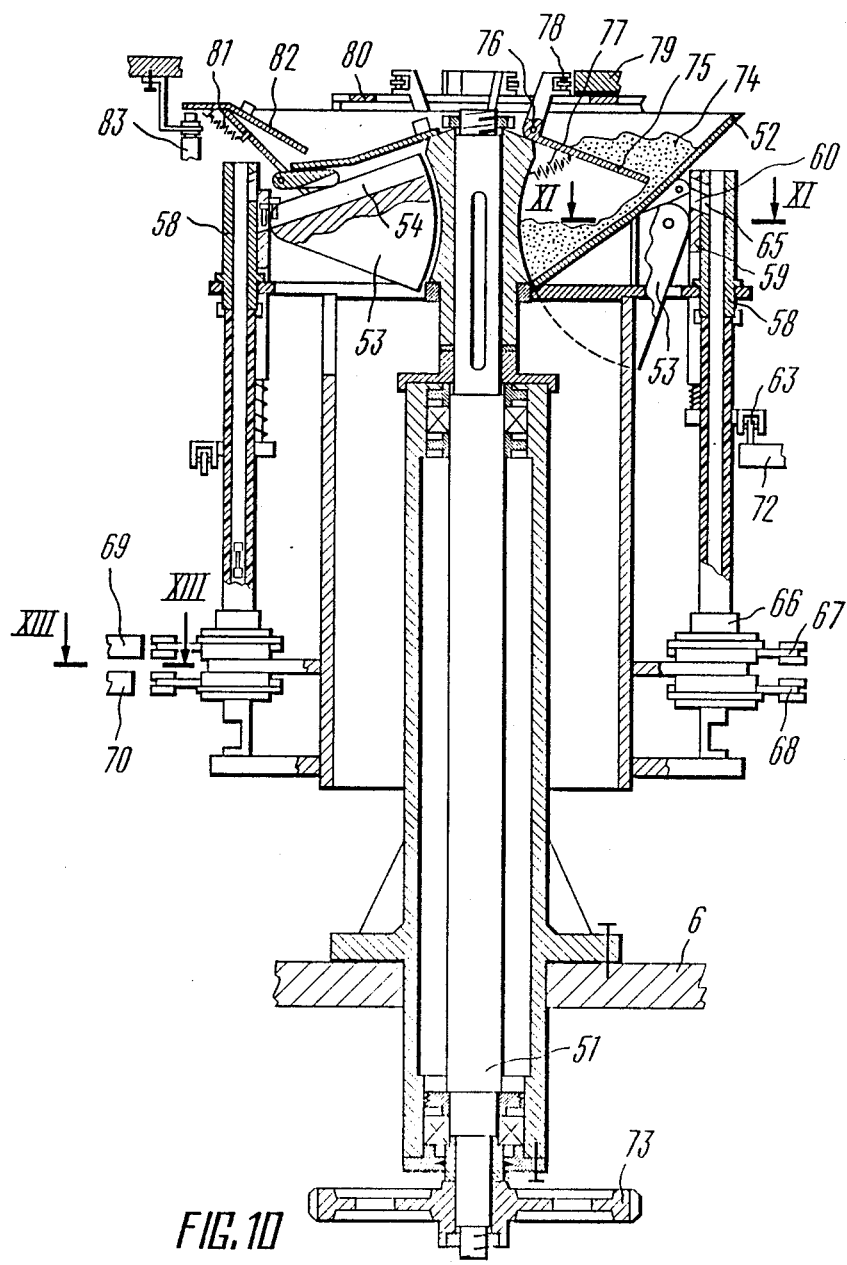
FIG. 10 is a section taken along line IX—IX in FIG. 7.

The automatic rotary means 8 for feeding the inserts 2 comrprises a shaft 51 (FIG. 10) mounted on the base 6 with a possibility of rotation from a drive (omitted in the drawing). The shaft 51 carries a hopper 52 with a conical bottom. Sector grips 53 are installed in the hopper 52 equadistantly on its periphery. Each sector grip 53 has slots 54 to grip the inserts 2. The sector grip 53 is provided with journals 55 (FIG. 11) resting in brackets 56 with a possibility of rocking in a vetical plane; the brackets 56 are attached to the hopper 52. The ends of the journals 55 carry gears 57. A collector tube 58 is installed on the hopper 52 opposite to each sector grip 53. A slider 59 with a through window 60 shaped as the insert 2 is fitted between the collector tubes 58 and the sector grips 53. The surface forming the through window 60 of the slider 59 are inclined by and angle of 30°-45° relative to the plane perpendicular to the axis of the collector tube 58. The slider 59 is rigidly fixed on plungers 61 (FIG. 12), which carry a rocker 62 with a roller 63 and return springs 64 to impart reciprocal motion to the slider 59. The collector tube 58 has a window 65 similar to that in the slider 59. The generatrices of the surface of said window are inclined by the same angle as the generatrices of the through window 60 of the slider 59 and are actually the extension thereof with the slider 59 in the topmost position.

The collector tube 58 is coupled to a unit 66 of shutoff devices 67 and 68 movable by a former 69 and a former 70 secured on the base 6. The former 70 is made in the form of a double-arm lever 27 with the feed cutoff mechanism 28 comprising the electromagnet 29 associated with the journal 32 of the lever 27 via the slider 30 with the inclined slot 31. The electromagnet is connected with the line control system through the memory 12.

The slider 59 mounts racks 71 kinematically associated with the gears 57 secured on the journals 56 of the sector grip 53. The roller 63 fixed on the rocker 62 of the slider 59 is free to contact a former 72 attached to the base 6. The automatic rotary means 8 is rotatable by a drive (omitted in the drawing) through a gear 73 secured on the shaft 51.

Each of the automatic rotary means 7 and 8 is provided with a pre-hopper 74 for keeping a stock of non-oriented parts. The pre-hopper is formed by the cylindrical shell of the hoppers 18 and 52 of the automatic rotary means 7 and 8 and the taper shell installed above the conical bottom of the hoppers 18 and 52 and made in the form of a cone with the vertex thereof facing the vertex of the hopper conical bottom.

The taper shell of the pre-hopper 74 is made composite in the form of radially disposed sectors 75, each mounted on the cylindrical shell of the hoppers 18 and 52, with a possibility of rocking on axles 76 and loaded by springs 77.

Each sector 75 is made in the form of a double-arm lever with one arm thereof carrying a roller 78 contacting a stationary cam 79 secured on the base 6 through a bracket 80 and the other arm having a surface interacting with a batch of parts loaded into the pre-hopper 74.

Secured with a possibility of rocking in the pre-hoppers 74 of the automatic rotary means 7 and 8 is an additional double-arm lever 82 loaded by a spring 81, whose one arm is meant for interaction with one sector 75 of the taper shell 74 and the other arm with a part level transducer 83 mounted on the base 6 and associated with the line control system.

Figures 15, 16:
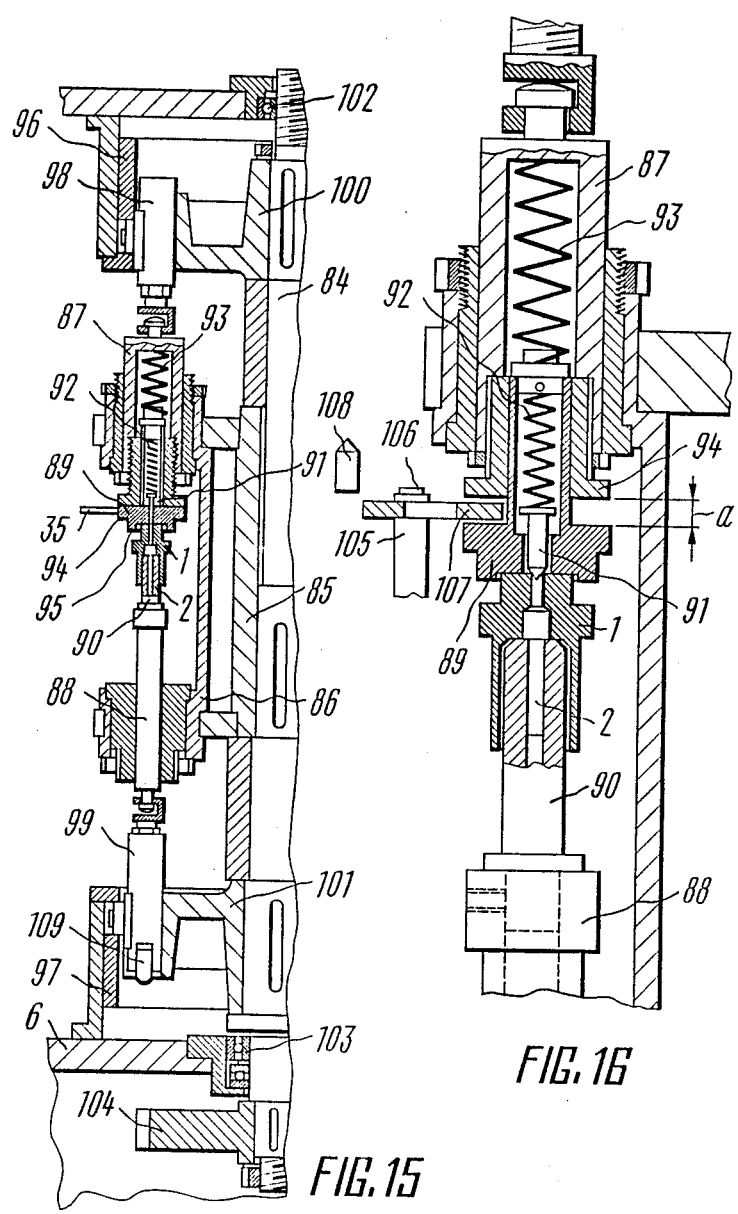
FIG. 15 shows a pressing rotor, longitudinal section, the moment of pressing with a minimum effort.
FIG. 16 presents a tool block of the pressing rotor, the moment of identifying unserviceable parts pressed with a minimum pressing effort.

The pressing rotor 9 comprises a drum 85 mounted on a drive shaft 84 (FIG. 15). The drum 85 has tool blicks 86 with upper 87 and lower 88 sliders, evenly spaced on its periphery. The sliders, installed with a possibility of reciprocal motion, are equipped with a support tool 89 and a punch 90. The support 89 houses a catcher 91 with a spring 92 installed coaxially with the tool. The slider encloses a calibrated spring 93 resting on the support 89 guided by a bushing 94 and the end surface of the slider has a centering catching groove 95 to receive the body of the tip 1.

The sliders 87 and 88 are coupled with rods 98 and 99 movable by formers 96 and 97 and fitted in drums 100 and 101 secured on the driver shaft 84. The latter rests in bearings 102 and 103 on the base 6 and is associated with the drive (omitted) via a gear 104. The base 6 mounts a bracket 105 with a lever 107 rotatable on the axle 106, and a contactless limit switch 108.

Figures 17, 18:
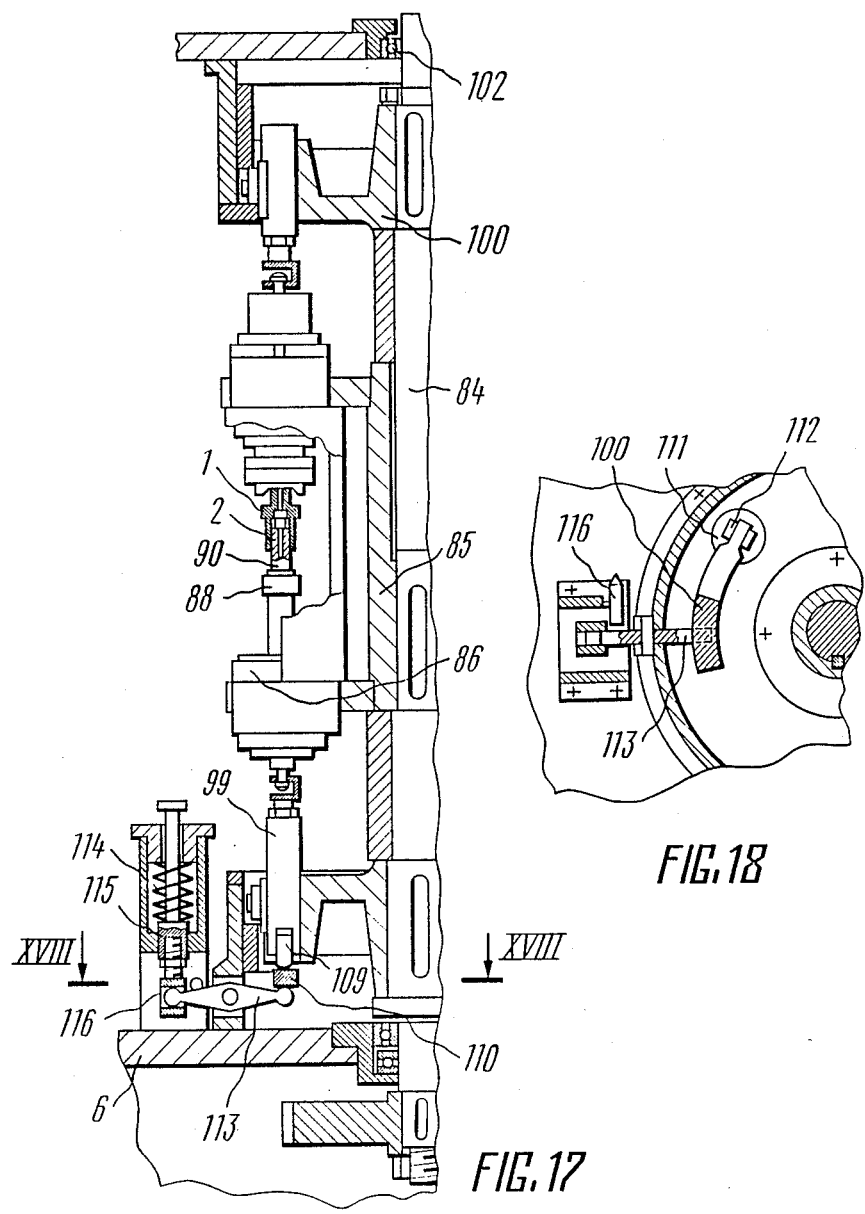
FIG. 17 shows a pressing rotor, longitudinal section, the moment of identifying unserviceable parts pressed with a maximum pressing effort.
FIG. 18 is a section taken along line XVIII—XVIII in FIG. 17.

The ends of the rod 99 carries a roller 109 resting on a former 110 (FIG. 17) hingedly mounted on the base 6 through a support 111 (FIG. 18) and an axle 112 and resting on a lever 113 associated with a rod 114, with a bank 115 of calibrated springs resting on the collar thereof. A contactless transducer 116 is installed close to the lever 113.

The transducer 116 is connected with the line control system via the memory 12. The caulking rotor 10 comprises, mounted on a drive shaft 117, a tool holder 118 (FIG. 19) with tool blocks 119 interacting with rods 120 of hydraulic cylinders 121 and sliders 122 coupled with a slot former 123. A gear 124 links the drive shaft 117 with the main drive of the line (omitted).

Figure 20:
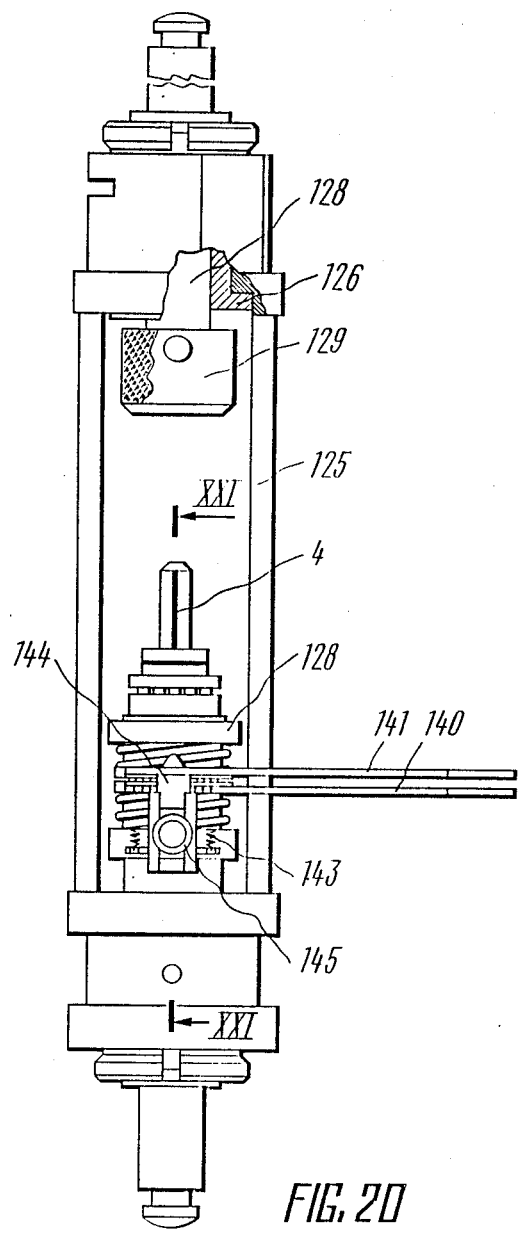
FIG. 20 shows a tool block of the cauling rotor.

The tool block 119 comprises a body 125 (FIG. 20) housing guide bushings 126 of rods 127 and 128. The rod 128 mounts a support 129 and the rod 127 carries the caulking punch 4 with a device 150 to monitor the depth of the caulking trail mounted coaxially therewith.

Figure 21:
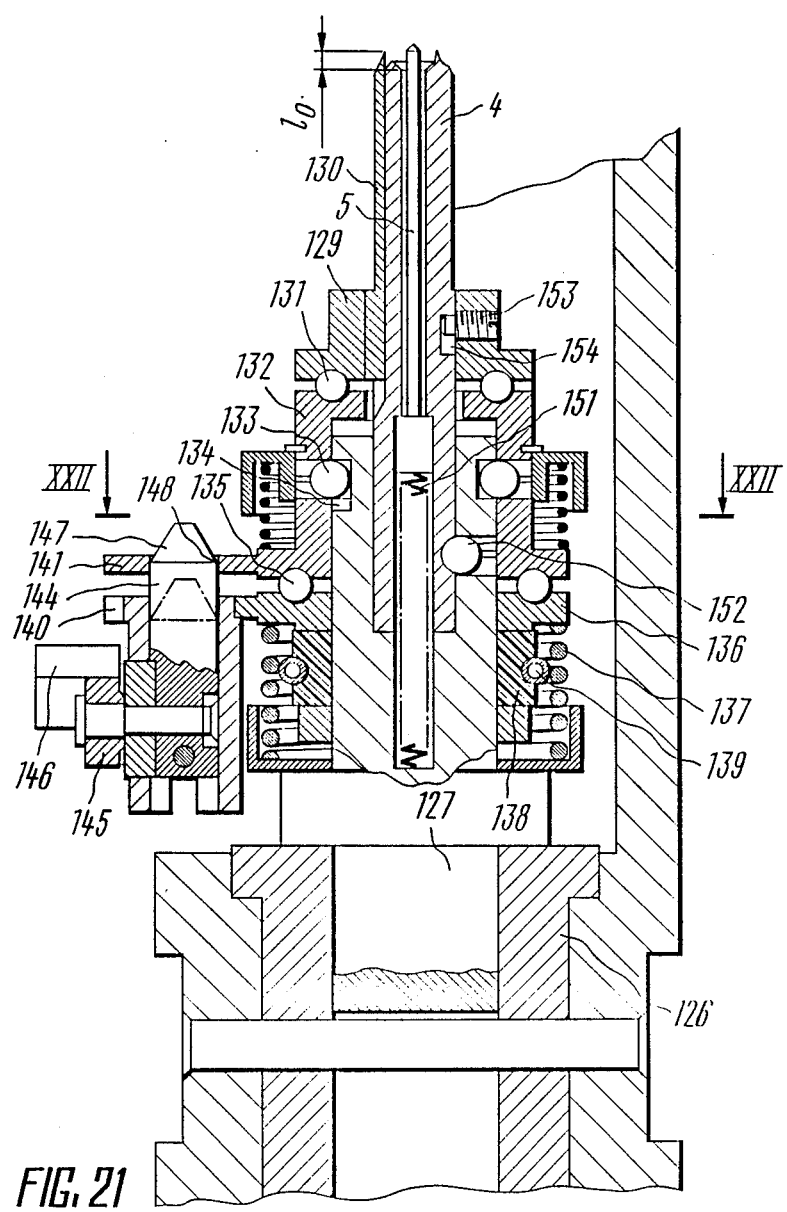
FIG. 21 is a section taken along line XXI—XXI in FIG. 21.

A device 150 to monitor the depth of the caulking trail incorporates a bushing 129, movable along the axis of the caulking punch 4, with measuring rods 130 (FIG. 21), resting, through balls 131, on a holder 132 associated with the rod 127 through balls 133, with spiral slots 134 being provided in the rod 127 to accommodate the latter balls. In its turn, the holder 132 rests, through balls 135, on a base bushing 136 loaded relative to the rod 127 by a spring 137 and braked on the rod 127 by friction blocks 138 with the aid of a spring 139.

Figure 5:
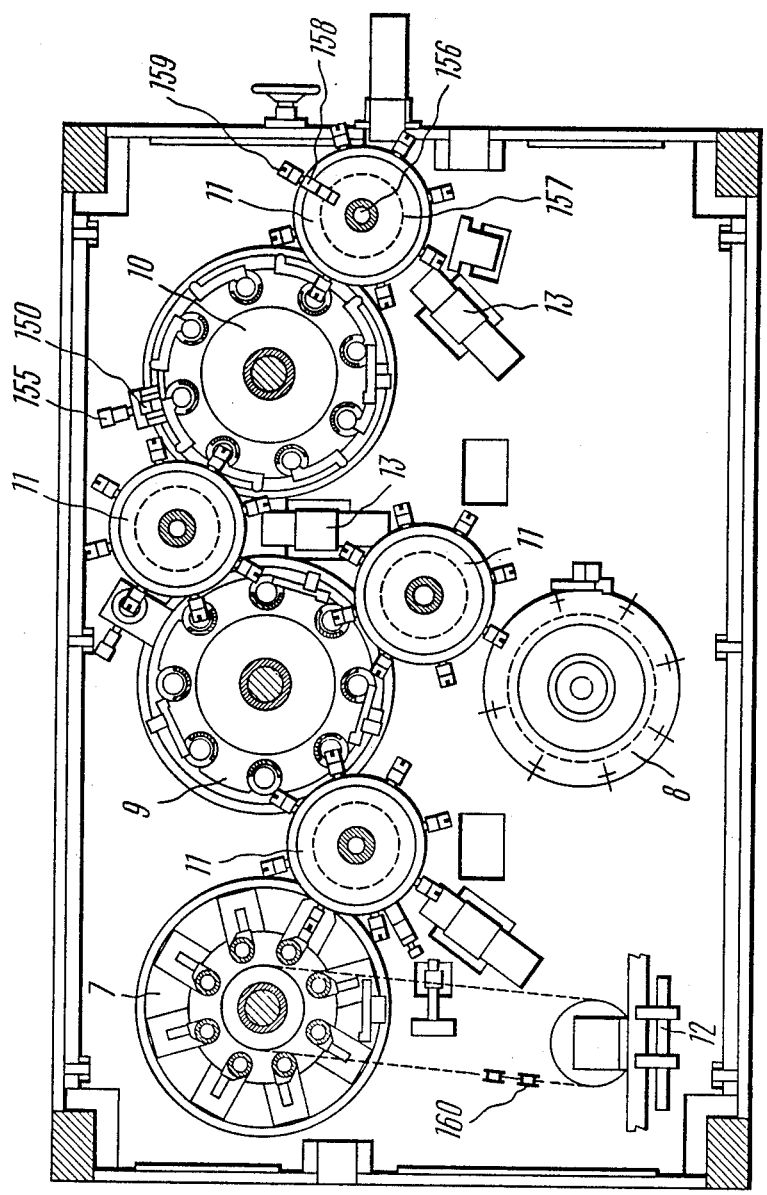
FIG. 5 is a section taken along line V—V in FIG. 3.
Figure 22:
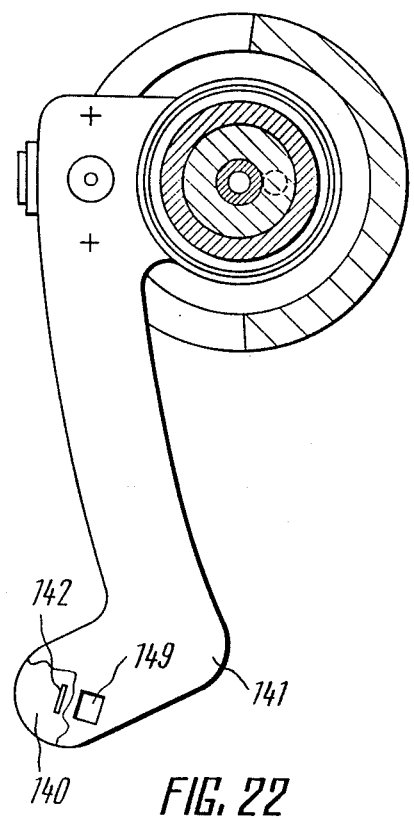
FIG. 22 is a section taken along line XXII—XXII in FIG. 21.
Figure 23:
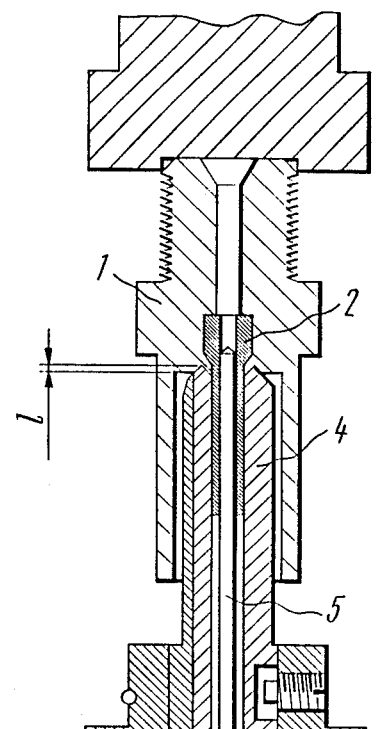
FIG. 23 illustrates a diagram for meansuring the depth of the cauling groove.

The base bushing 136 and the holder 132 have flags 140 and 141, respectively. The flag 140 of the base bushing 136 has a narrow slit 142 (FIG. 22) and a sharpened rod 144 (FIG. 20) loaded by springs 143, interacting, via a roller 145 with a former 146 (FIG. 21) and with a hole 148 on the flag 141 of the holder 132 through a taper 147. The flag 141 also has a slit 149 to pass the light beams of a photosensor 150 (FIG. 5). The caulking punch 4 encloses the calibration needle 5 loaded by a safety spring 151. The caulking punch 4 is secured in the rod 127 through a ball 152. The bushing 129 with the measuring rods 130 has a set screw 153, whose cylindrical end is accommodated in a slot 154 serving as a thrust for the extreme position of the bushing 129.

A synchronization transducer 155 (FIG. 5) is fitted in the monitoring zone of the photosensor 150.

Signals from the photosensor 150 arrive at the line control system through the memory 12.

The automatic rotary means for feeding tip bodies and inserts, the pressing rotor 9 and the caulking rotor 10 are interconnected by the transportation rotors 11 intended for transferring the parts from rotor to rotor and made in the form of drive shafts 156 (FIG. 5) mounted on the base 6, with rigidly secured disks 157 whose radially disposed holes fit spring-loaded sliders 158 with tong-like grips 159.

The memory 12 is electrically connected with the line control system and kinematically associated with the line drive with the aid of, for instance, a chain drive 160.

A rotor line for assembly of tips for flexible hoses of brakes operates as follows.

The bodies of the tips 1 for flexible hoses of brakes are loaded into the hopper of the elevator hoist 15 wherefrom they are fed to the pre-hopper of the automatic rotary means 7 for feeding the bodies of the tips 1.

The inserts 2 are loaded into the pre-hopper of the automatic rotary means for feeding the inserts 2.

As the shaft 17 of the automatic rotary means 7 starts rotating, the hopper 18 rigidly secured thereon also rotates with the pre-hopper 74 formed by the conical bottom of the hopper 18 and the taper shell consisting of individual spring-loaded sectors 75. Alternately interacting through their rollers 78 with the stationary cam 79, the sectors 75 of the pre-hopper 74 stir the bodies of the tips 1, which are fed onto the bottom of the hopper through the annular slot formed by the conical bottom of the hopper 18 and the taper shell. The rotating gripping members with the funnels 20 grip the bodies of the tips 1 and transfer them to the collectors 21. Acted upon by the pressure of a batch of the bodies of the tips 1, loaded into the pre-hopper 74, the double-arm lever 82 overcomes the resistance of the spring 81 and goes up, receding from the parts level transducer 83 to signal that the latter is full. In the process of operation of the automatic rotary means 7, the pre-hopper 74 is emptied of the bodies of the tips 1, and one arm of the lever 82 is released and acted upon by the spring 81, goes down, thereby bringing the other arm of the lever 82 closer to the transducer 83. This is actually the signal to turn on the elevator hoist 15 for replenishment of the pre-hopper 74.

From the collectors 21, the bodies of the tips 1 come to the piece-wise feed mechanisms 22, wherefrom they are sent piece-wise to the channel 35 of the revolving drum 34 with the aid of shutoff devices 23 and 24 actuated by the formers 25 and 26. Passing through the channel 35 and the hole 41 of the plate 40, the oriented body of the tip 1 comes to the end of the rod 48. If the body of the tip 1 is in the requisite position, i.e. when the longer hole is face down, its upper end is lower than the plate 40 and is not clamped by the generatrix of the hole 41 and the stops 42 under the action of the springs 39 as the roller 45 of the plate 40 leaves the former 46. As this takes place, the body of the tip is not held in the body of the revolving drum 34 and goes down together with the rod 48 as the latter interacts with the former 50.

If the body of the tip 1 is in a position requiring reorientation, i.e. with the smaller depth of the hole face down, it will pass through the channel 35 and the hole 41 of the plate 40 to find itself on the end of the rod 48 in a position whereat its upper end is in the hole 41 of the plate 40. As the plate 40 is shifted by the springs 39, the slot 44 turns the stops 42 by the second end of the lever 43 to bring them to a position hampering movement for the bodies of the tips 1. At the same time, the bodies of the tips are clamped by the generatrix of the hole 41 and said stops 42, and the body of the tip 1 does not shift relative to the axis of channel 35. In this clamped position, the body of the tip 1 jointly with the revolving drum 34 turns through 180° with the aid of the rack 37 and the toothed shank 36 actuated by the former 38. The rod 48 is re-introduced into the channel 35, the plate 40 returns to the initial position, and the body of the tip 1 is released to be fitted on the rod 48 and carried downwards therewith. The body of the tip 1 is thus again in the correctly oriented position. The revolving drum 34 returns to the initial position to receive the next part.

The tong-like grips 159 of the transportation rotor 11 remove the body of the tip 1 from the rod 48 and transfer it to the loading zone of the pressing rotor 9.

The inserts 2 are placed in the pre-hopper 74 of the hopper 52. Rotation of the shaft 51 imparts rotary motion to the hopper 52 with the pre-hopper 74 formed by the conical bottom of the hopper 52 and the taper shell consisting of individual sectors 75 loaded by the spring 77. The rollers 78 of the sectors 75 alternately contact the stationary cam 79 to stir the inserts, which fall onto the bottom of the hopper 52 through the annular slot formed by the conical bottom of the hopper 52 and the taper shell.

As the shaft 51 rotates, the sectors 53 are set rocking on the journals 55 via the rack-and-gear drive 57, 71 actuated by the former 72 through the roller 63 of the rocker 62 and the plunger 61. Lowering into a heap of the inserts 2, the slots 54 of the sectors 53 grip and orient them and, moving up, direct them to the window 60 of the plate 59, which is in the lower position. In the meantime, one of the inserts 2 enters the window 60. As the sector 53 goes down, the plate 59 with one insert 2 hanging on the generatrices of the window 60 assumes the topmost position. The insert 2 slides down the generatrices of the window 60 into the collector tube 58 through the window 65, wherefrom it arrives at the unit 66 of the shutoff devices 67 and 68 which, actuated by the formers 69 and 70, send it piecewise to a level whereat it is gripped by the tonglike grips 159 of the transportation rotor 11 to be transferred to the loading zone of the pressing rotor 9.

If it is necessary to discontinue the feed of the insert 2 (the tip 1) to one or several tool blocks of the pressing rotor, e.g. in case of failure, the former 70 is removed from the shutoff devices 68 (24), as a result of which the part (1,2) is not fed to the loading level. The former 70 is actuated by the feed cutoff mechanism 28. The signal from the control system comes to the electromagnet 29 which turns the lever 27 of the former 70 via the journal 32 with the aid of the slider 30 with the inclined slot 31.

The transportation rotor 11 transfers piece-wise the insert 2 to the tool block 86 (FIG. 17) and aligns it with the catcher 91 and the hole of the punch 90, whereupon the catcher 91 pushes it into said hole of the punch 90. Thus the insert 2 finds it way to the tool block 86; moving with the drum 85, the insert subsequently reaches the loading zone of the tip 1, which is also alignment with the catching groove 95, and receives the punch 90. Both parts being assembled—the body of the tip 1 and the insert 2—are thus loaded into the tool block 86 and aligned with each other, ready for the insert 2 to be pressed into the body of the tip 1.

Specifications for the assembly of said parts restrict the minimum and maximum pressing efforts, i.e. the pressing effort must not go beyond the limits of the prescribed pressure interval. Accordingly, the pressing rotor has two pressing zones—a minimum effort monitoring zone and a maximum effort monitoring zone.

The minimum pressing effort is monitored as follows. The former 97 lifts the rod 99, and the latter shifts the slider 98 with the punch 90 which encloses the parts 1 and 2 being assembled till they thrust against the support 89. The latter is loaded by the spring 96 calibrated for the preset minimum pressing effort. If pressing the insert 2 into the body the body of the tip 1 takes an effort smaller than that built up by the spring 93, the insert will be pressed into the tip body and the clearance between the collar of the support 89 and the collar of the guide bushing 94 will remain. The lever 107 will enter the clearance and will not deflect on the axle 106 or close the contactless limit switch 108. This signal is transmitted to the memory. Such a part will be subsequently rejected.

If pressing the insert 2 into the body of the tip 1 requires an effort greater than that exerted by the calibrated spring 93, the support 89, as the slider 88 with the punch 90 and parts 1 and 2 go up till pressed to it, will also go up and compress the spring 93, as a result of which the clearance between the collars of the support 89 and the bushing 94 will disappear. Such a part is considered to have passed the test for the minimum pressing effort.

The tool block 86 with this part moves to the maximum pressing effort monitoring zone. The roller 109 of the rod 99 runs into the end former 110 and lifts the slider 88 with the punch 90 till it thrusts against the support 89. If the pressing effort exceeds the maximum permissible value to which the bank 115 of disk springs has been adjusted, the former will go down after turning around its axis 112 and press the lever 113 which will shift the rod 114 and compress the bank 115 of disk springs. While turning, the lever 113 will close the contactless switch 116. This signal is transmitted to the memory. Such a part will be subsequently rejected, as the pressing effort was in excess of the maximum permissible value.

If the pressing effort is weaker than the one to which the bank 115 of disk springs has been adjusted and greater than the minimum permissible, the lever 113 will not turn to cut off the transducer 116; such a part is regarded as fit for use.

The transportation rotor 11 extracts serviceable parts from the tool blocks 86 of the pressing rotor 9 and transfers them to the tool blocks 119 of the cauling rotor 10 and the support 50. The support 129 of the rod 128 presses the tip 1 to the surface of the caulking punch 4, sinking the measuring rods 130 with the bushing 126 by the value "1", thereby preparing the monitoring device for monitoring the depth "1" of the caulking trail. This motion places the tips of the measuring rods 130 in the same plane with the tip of the caulking punch 4. As the bushing 126 lowers to the value "1", the rod 127 also goes down and simultaneously turns about its axis due to the interaction of the balls 133 with the spiral slot 134 of the rod 127, the holder 132 with the flag 141 and the base bushing 136 with the flag 140, as the holder 132 and the base bushing 136 at this moment are coupled by the rod 144, the latter being preliminarily accommodated in the hole 148 on the flag 141 of the holder 132. As a result, the monitoring device assumes a position whereast the apex of the caulking groove 4 is taken as a basis for measuring the depth of the caulking trail "1". This makes it possible to measure the depth of the caulking trail "1" excluding the error arising as the tip of the caulking tool blunts.

Prior to caulking and monitoring the depth of the caulking trail "1", the roller 145 of the rod 114 runs into the former 146 and evacuates the hole 148 of the flag 141, as a result of which the base bushing 136 is disconnected from the holder 132 and assumes a stationary position relative to the rod 127; consequently, the flag 140 with the narrow slot 142 is also stationary. As the tip of the caulking punch 4 ingresses into the metal of the tip 1, the measuring rods 130 with the bushing 129 shift downwards relative to the caulking punch by the real value "1"; of the caulking trail. The balls 133 and the spiral slots 134 on the rod 127 transform this movement into accelerated motion of the slot 149 of the flag 141 on the holder 132 in the direction of the stationary slot 142. If the slot 149 overlaps the slot 142, the depth of the caulking train is within the prescribed limits. If the slot 149 fails to overlap the narrow slot 142, the depth "1" of the caulking train is insufficient. As the slot 149 overlaps the slot 142, the light beam from the photosensor 150 fails to be overlapped; this signal comes to the control system together with the signal fed from the synchronization transducer 155, which testifies to the normal depth of the caulking trail. If the slot 149 fails short of the slot 142, the light beam from the photosensor 150 is overlapped by the flags 140 and 141, and the signal comes through the memory 12 to the control system only from the synchronization transducer 155, which is evidence of the insufficient depth of the caulking trail. The control system can react to this signal either by increasing the oil pressure in the hydraulic cylinder 121 or by giving the command to replace the tool block 119 containing a blunt caulking punch 4.

From the tool block 119 of the caulking rotor 10, the tip is extracted by the tong-like grips 159 of the transportation rotor 11 to be transferred to the finished products collection zone. The tips rejected on the basis of the depth of the caulking trail are released from the grips 159 to the reject container with the aid of the scrap removal mechanism 13. The remaining tips are transferred to the zone of finished products.

What is claimed is:

1. A rotary line for assembly of a tip for a flexible hose, comprising, mounted on a base; an automatic rotary means for feeding a line with bodies of tips; an automatic rotary means for feeding a line with inserts; transportation rotors; a pressing rotor; devices to monitor the minimum and maximum pressing efforts, incorporated in said pressing rotor; an automatic rotary caulking means; a tool holder mounted on a drive shaft and coupled with said automatic rotary caulking means; tool blocks coupled with said tool holder, each made in the form of coaxial rods; a support tool coupled with one of said rods; a caulking punch of said automatic rotary caulking means, a coupled with the other coaxial rod; a control system; a memory of said control system, coupled with said automatic rotary means for feeding the line with tip bodies and said automatic rotary means for feeding the line with inserts; devices for monitoring the depth of a caulking trail, fitted in said tool blocks of said caulking rotor; photosensors through which the devices for monitoring the depth of the caulking trail are coupled with said memory of said line control system, a bushing as an element of said device for monitoring the depth of the caulking trail, installed on said caulking punch with a possibility of axial displacement; measuring rods associated with said bushing; a holder as an element of said device for monitoring the depth of the caulking trail, having recesses of its side surface, arranged on said measuring rods carrying said caulking punch with a possibility of axial and angular displacement and interaction of its end surface with the end surface of said bushing; balls fitted in spiral slots of said measuring rods carrying said caulking punch and partially in the recesses of the holder and associating the latter with said bushing, a base bushing installed on said measuring rods with a possibility of its end surface interacting, through said balls, with the end surface of said holder and spring-loaded relative to said measuring rods along its axis towards said caulking punch; a rod lock with a roller, arranged parallel to the axis of said base bushing and spring-loaded relative to the latter; radially spring-loaded friction blocks fitted between said base bushing and said measuring rods; flags located on said base bushing and holder and having slots to pass the beams of said photosensor, said flag of the base bushing carrying said rod lock and the flag of the holder having a hole accommodating said lock; a former interacting with said roller of said lock.

2. The rotary line as claimed in claim 1, comprising revolving drums for secondary orientation of tip bodies; a clamping mechanism made in the form of a spring-loaded plate with a hole, free to displace in a horizontal plane, the diameter of the hole of the plate being larger than that of a channel in said revolving drum; two stops arranged under said plate, each free to rotate in a horizontal plane towards each other; a body as an element of said clamping mechanism; levers installed in said body under said plate with a possibility of rocking, one end of each lever being rigidly coupled with said stops and the other end being free to move in a slot made in said plate.

3. The rotary line as claimed in claim 1, comprising an identification mechanism made in the form of a rod free to reciprocate along a channel of the revolving drum.

4. The rotary line as claimed in claim 1, comprising a shaft rotatably mounted on a base; collector tubes for oriented feed of inserts, with a window on the side surface of each tube; sector grips for inserts; shutoff devices of the automatic rotary means for feeding the line with inserts, each made in the form of a slider with a through window, free to reciprocate in the direction parallel to the axis of said shaft between a suitable said collector tube and said sector grip.

5. The rotary line as claimed in claim 4, wherein generatrices of said through window in said slider and window of said collector tube are inclined in one direction, towards the hole in said collector tube.

6. The rotary line as claimed in claim 5, wherein an inclination angle of the generatrices of the through window in the slider and said window of the collector tube is 30°–45° with respect to the plane perpendicular to the axis of said collector tube.

7. The rotary line as claimed in claim 1, comprising sectors of a hopper; a cylindrical shell of said hopper, carrying radially disposed sectors with a possibility of rocking in a plane perpendicular to the axis of rotation of said hopper.

8. The rotary line as claimed in claim 7, in which each sector is made in the form of a double-arm lever spring-loaded relative to said cylindrical shell of the hopper with a possibility of rocking in a plane perpendicular to the axis of rotation of said hopper.

9. The rotary line as claimed in claim 1, comprising a transducer for monitoring the level of parts, associated with said automatic rotary feed means and mounted on said base; a double-arm lever spring-loaded relative to a cylindrical shell of a hopper, one arm of which is associated with said transducer for monitoring the level of parts and the other being free to interact with one of a sector of the cylindrical shell.

* * * * *